United States Patent [19]
Baumann et al.

[11] Patent Number: 6,068,251
[45] Date of Patent: May 30, 2000

[54] SHOCK LIMITING APPARATUS

[75] Inventors: Robert Allen Baumann, Farmington; Robert Arthur Deike, Frazee; Denis Allen LaCroix, St. Paul, all of Minn.

[73] Assignee: Lockheed Martin Corporation, Bethesda, Md.

[21] Appl. No.: 09/153,601

[22] Filed: Sep. 15, 1998

[51] Int. Cl.[7] ........................................................ F16F 1/00
[52] U.S. Cl. ............................ 267/182; 248/585; 248/595
[58] Field of Search ................................. 267/140.11, 182; 248/564, 567, 584, 585, 591, 592, 593, 595, 630

[56] References Cited

U.S. PATENT DOCUMENTS

| | | | |
|---|---|---|---|
| 3,826,457 | 7/1974 | Huot De Longchamp | 248/585 |
| 5,388,801 | 2/1995 | Edrich et al. | 248/564 |
| 5,419,528 | 5/1995 | Carter et al. | 248/585 |

*Primary Examiner*—Robert J. Oberleitner
*Assistant Examiner*—Pamela J. Lipka
*Attorney, Agent, or Firm*—Glenn W. Bowen; Patrick M. Hogan

[57] ABSTRACT

An apparatus that supports a load and limits shock force from being transmitted through the four elongated struts that are positioned to support the load. The struts are aligned at an acute angle relative to a base when no shock force is applied to the load. The struts pivot to a second smaller acute angle relative to the base when a shock force is applied to the load. A pair of leaf-springs, which may consist of a stack of several leaf-springs, is associated with each pair of struts so that when a shock force is applied to the load, the leaf-springs apply a return force that drives the struts back to the first acute angle alignment with the base. Restraint members coupled to the struts are used to align them at the first angle relative to said base when no shock force is applied to the load.

20 Claims, 4 Drawing Sheets

SHOCK LIMITING APPARATUS

This invention was made with Government support under Contract No. N00024-D-96-5215 awarded by the United States Navy. The Government has certain rights in this invention.

FIELD OF THE INVENTION

The invention relates to shock limiting mechanisms, which become effective only when a predetermined shock load is exceeded, and in particular to shock limiters used for the protection and testing of delicate equipment, such as electronic apparatus.

BACKGROUND OF THE INVENTION

Electronic equipment and other sensitive equipment, which is operated in harsh environments, requires that any shock force that is applied to the equipment be limited to prevent the equipment from being damaged or destroyed. Numerous resilient shock mounts have been designed which will limit the shock, but they have the undesirable characteristic of causing vibration resonance, which can be as destructive to the equipment as the original shock blow. A number of prior resilient mounts have been designed for shock limiting purposes that tend to sag over time and they, therefore, lose their ability to limit the shock blow effectively.

The present invention provides a shock limiter that does not go into resonance, which may be inexpensively manufactured and which exhibits a minimum amount of sag during a long effective-lifetime. Furthermore, the shock limiter of the present invention is scalable and can be designed to support a wide range of weights and shock levels.

SUMMARY OF THE INVENTION

A shock limiting apparatus limits a shock from being transmitted through a load it supports. The apparatus has a first pair of parallel, spaced-apart, elongated struts on opposite sides of the apparatus that are aligned at a first acute angle relative to the base when the load is supported by the apparatus, and a second pair of parallel, spaced-apart, elongated struts on opposite sides of the apparatus that are aligned at a second acute angle relative to the base when the load is supported by the apparatus. The upper ends of the struts on the same side of the apparatus are closer to each other than are the lower ends of these struts.

A pair of parallel upper rods is positioned parallel to the base and to each other. Each upper rod is aligned so that it passes through holes at the top of the struts of one of the first or second pairs of struts.

A pair of lower rods is positioned parallel to said base and to each other. Each lower rod is aligned so that it passes through holes at the bottom of the struts of one of the first or second pairs of struts.

A pair of leaf-springs is placed inwardly of one of the struts of the first and second pairs of struts that extend in width substantially between the struts of the associated pair of struts. Longitudinally the leaf-springs start at the base and extend along the base, then they are placed between one of the lower rods and the base in a direction away from the center of the load and around the side of the lower rod toward the outside of said load, and then in a direction back toward the center of said load until said first leaf-spring contacts on the side of the upper rod closest to said center of said load.

A pair of slide rods is positioned parallel to the base and normal to a pair of upper rods on each side of the apparatus. These rods pass into a bore in the upper rods so that these slide rods are freely movable with respect to one of the bores and are secured in the other of the bores.

BRIEF DESCRIPTION OF THE DRAWINGS

The present invention is described by reference to the drawings in which.

TECHNICAL DESCRIPTION OF THE INVENTION

Figure 1:
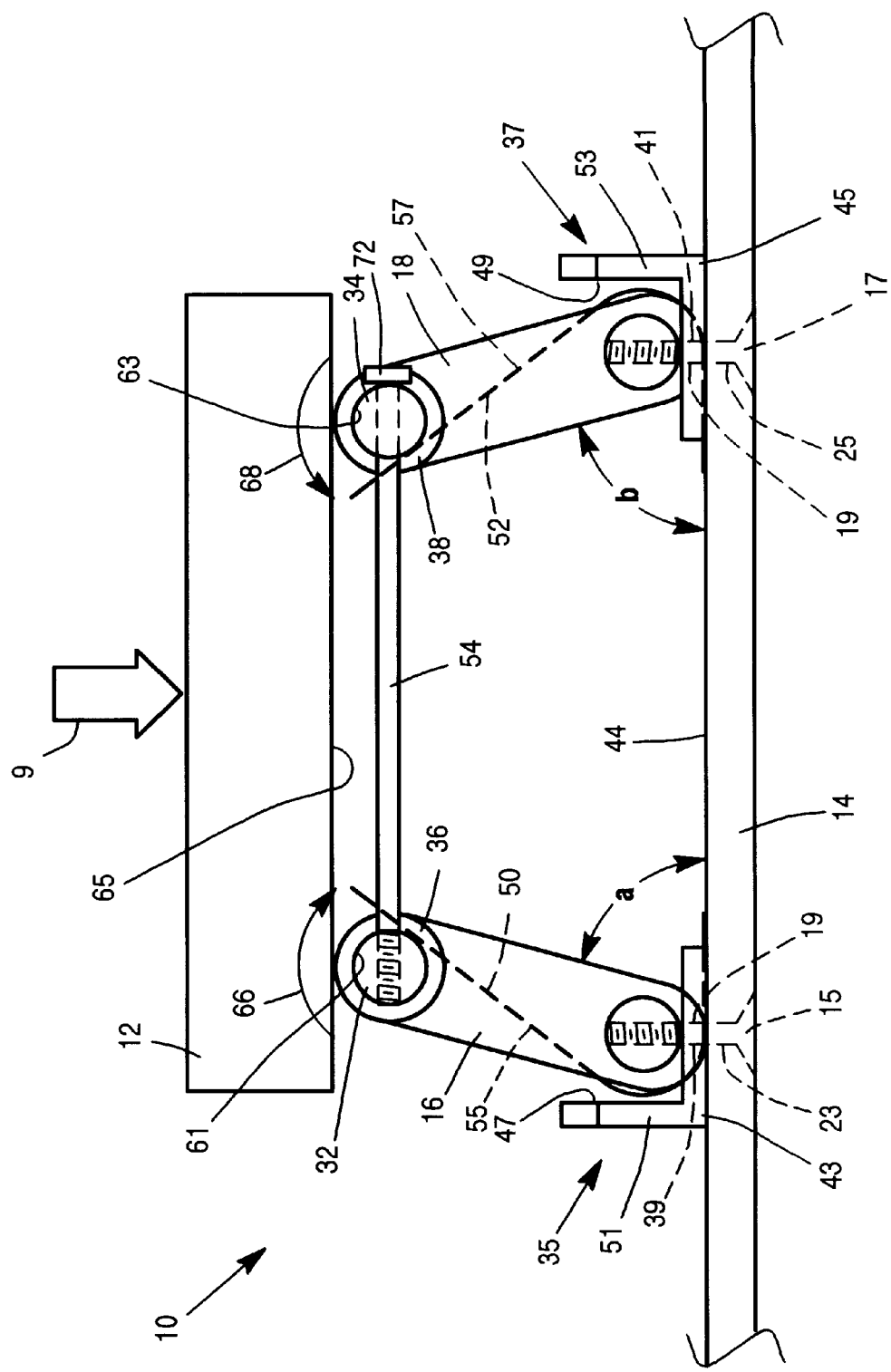
FIG. 1 illustrates a side view of the shock limiter mechanism of the present invention, which is shown as supporting a load to which shock is not applied.
Figure 3:
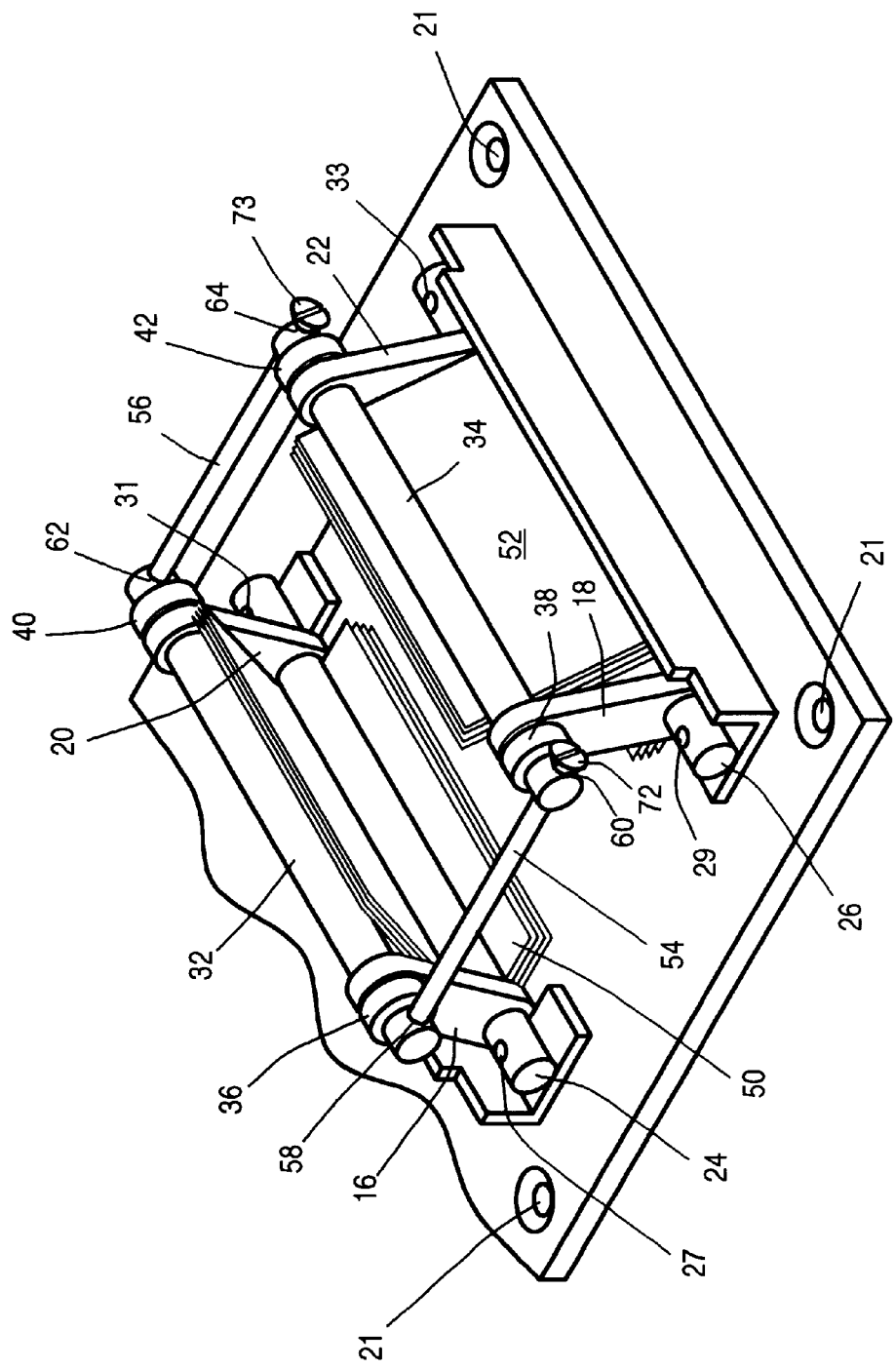
FIG. 3 is a perspective view of the shock-limiter, (with the load removed for clarity of presentation), when no shock is being applied.

The shock limiting mechanism 10 of the invention is shown in the side view of FIG. 1 when it is supporting a load 12 but no shock is being applied. The force or weight of the load, represented by the white arrow 9, is carried by the struts 16, 18, 20, 22 (FIG. 3). The shock limiting mechanism 10 has a rigid support base 14, which may be secured to a structural member by conventional mounting devices, such as by screws or bolts (not shown) inserted into the holes 21.

Figure 4:
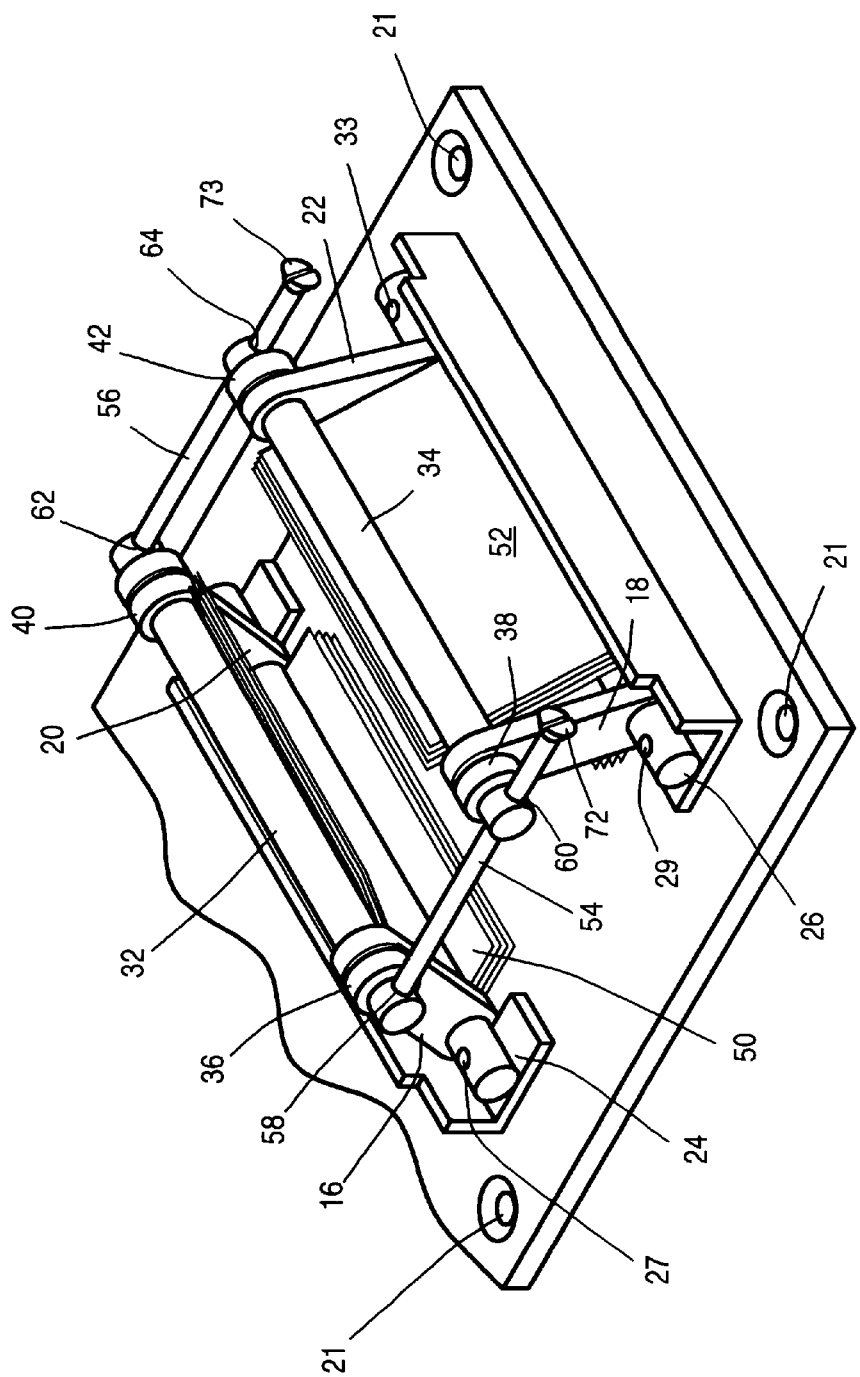
FIG. 4 is a perspective view of the shock limiter, mechanism, (with the load removed for clarity of presentation), when a shock is being applied.

As shown in FIGS. 3 and 4, the strut 20 is spaced apart and parallel to the strut 16, and the strut 22 is spaced apart and parallel to the strut 18. Lower rods 24, 26 respectively pass through the holes 11, 13 in the lower ends of the struts 16, 18, and through similar holes (not shown) in the lower ends of the struts 20, 22. The rods 24, 26 are attached to the base 14 by screws, (such as the screws 15, 17), which are inserted into holes in the base 14, such as the holes 23, 25, and into holes in the lower legs 43, 45 of the L-shaped brackets 35, 37, (such as the holes 39, 41). The threaded ends 19 of these screws are threaded into the threaded holes 27, 29, 31, 33 in the lower rods 24, 26 (FIG. 3).

Figure 2:
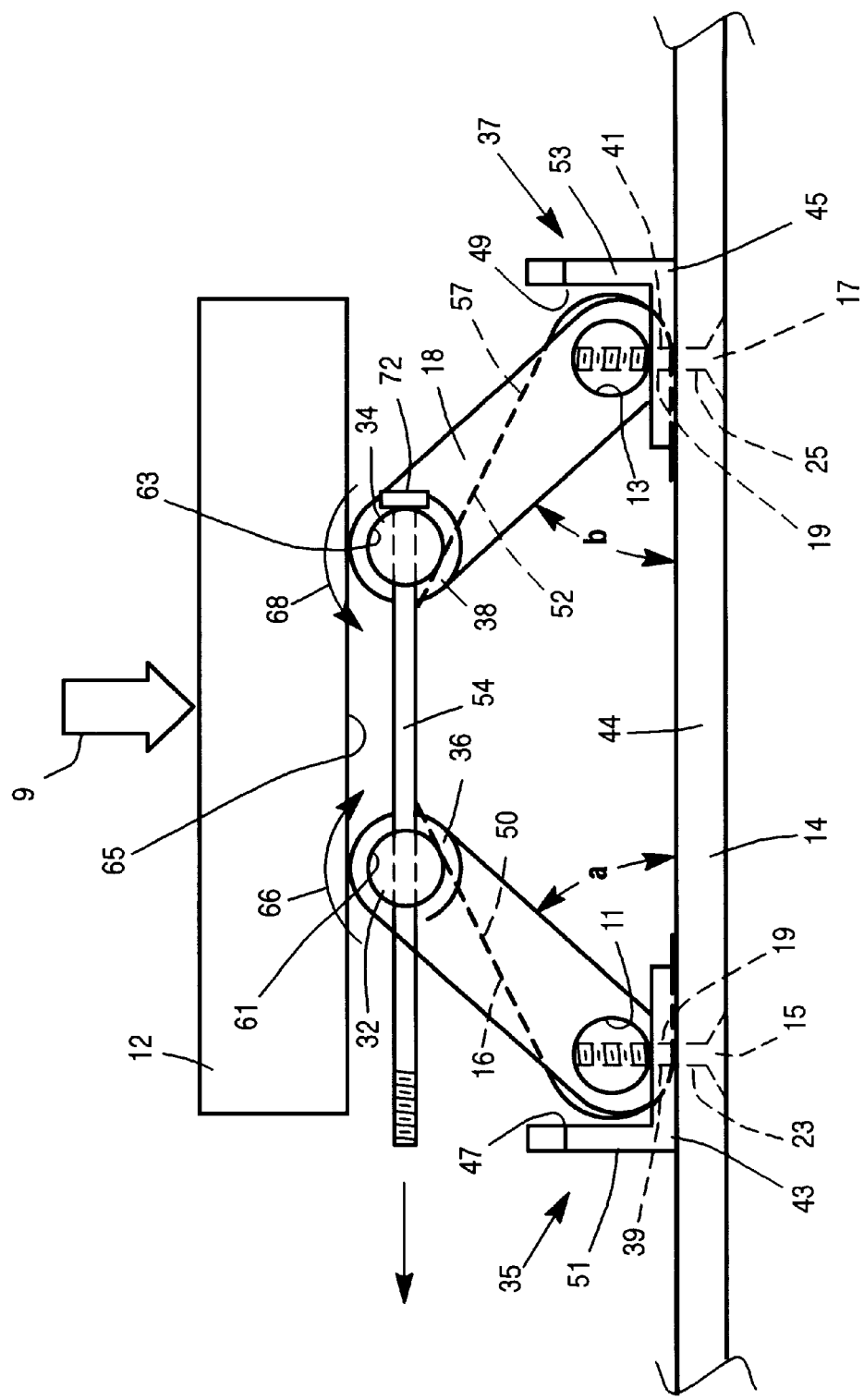
FIG. 2 is a side view of the shock limiter mechanism when a shock is supplied to the supported load.

The L-shaped support brackets 35, 37 have vertical legs 51, 53, which prevent the leaf-springs 50, 52 from bowing outwardly too far. The springs 50, 52 are shown in FIGS. 1 and 2 as single leaf-springs, but a stack of a multiple number of leaf-springs, such as shown in FIGS. 3 and 4, is preferable. The lower rod 24 allows the struts 16, 20 to pivot about it, and the pivot rod 26 allows the struts 18, 22 to pivot about it. When the load 12 is applied but there is no shock force 9 the struts are aligned at acute angles with respect to the base 14, such as the angles a and b, which place the upper end of the struts closer together than their lower ends.

Additional holes are provided, such as the holes 61, 63, at the upper end of the struts 16–22, to receive the upper rods 32, 34. The upper rod 32 carries support cylinders 36, 38, while the rod 34 carries short support cylinders 40, 42. Each of the support cylinders contacts the bottom 65 of the load 12. The support cylinders are located just outwardly of, and adjacent to, their respective struts. The upper rods 32, 34 serve to lock the elongated leaf-springs 50 and 52 in place under them. The lower ends of the leaf-springs wrap outwardly around the lower rods 24, 26 and extend along the upper surface 44 of the base 14.

A pair of slide rods 54 and 56 extends in a horizontal direction parallel to the base 14. The slide rod 54 projects through a horizontally disposed opening 60 in the outer portions of the rod 34 and is screwed into the threaded opening 58 of the outer portion of the rod 32. The slide rod 56 extends in a horizontal direction and projects through an opening 64 in the rod 34 and is screwed into the threaded opening 62 in the rod 32.

FIGS. 1 and 3 show the shock limiter of the invention when it does not have a shock force applied to it. The rods 32, 34 are forced outwardly in the horizontal direction by the springs 50, 52. When a shock force is applied the strut 16 of FIG. 1 (and the strut 20) will thus be initially rotated in a clockwise direction by the load force, as shown by arrow 66. The strut 18 (and the strut 22) will simultaneously be rotated, as shown by the arrow 68, in a counterclockwise direction by the shock force in FIG. 1.

FIGS. 2 and 4 show the shock limiter when a shock force is applied. For example, the angles a and b between the struts 16 and 18 and the base-plate 14 may initially be 45 degrees when no downwardly directed force component of the shock force is greater than the upwardly directed spring force of the leaf-springs 50 and 52. The threaded slide rods 54, 56 are adjusted to accommodate the load with no shock force, for example, with no shock force (FIGS. 1 and 3), so the head 72 of the slide rod 54 will abut the upper rod 34, and the head 73 of the slide rod 56 will also abut the upper rod 34. This creates an outwardly directed force on the rod 34 by the leaf-spring 52. The slide rods 56, 58 may alternately be screwed into the rods 34 instead of the rod 32.

When a downward shock force is applied to the load that exceeds the upward force provided by the leaf-springs, the struts 16, 20 will rotate in a clockwise direction, (as shown by the arrow 66 for the strut 16), and the struts 18 and 22 will rotate in a counterclockwise direction, (as shown by the arrow 68 for the strut 18). The upper ends of the struts 16 and 18 will then approach each other as the load 12 is driven downward toward the base 14. The threaded ends of the slide rods 54, 56 will, therefore, remain fixed in one of the rods, while the heads of the slide rods will be displaced away from the other rod, as shown in FIGS. 2 and 4, when the downward shock force exceeds the upward spring force. The inner surface 47 of the vertical leg 51 of the bracket 35 will contact the surface 55 of the leaf-spring 50 to revert the leaf-spring 50 from bowing too much. In a similar manner, the inner surface 49 of the vertical leg 53 of the bracket 37 will contact the surface 57 to prevent the leaf-spring 52 from bowing too much.

Any excess shock force is thereby eliminated by being translated into motion of the load instead of being transmitted through it. When the load returns to its initial position shown in FIGS. 1 and 3 the screw heads will again engage the rod from which it was displaced, and oscillation of the load will be prevented or minimized.

What is claimed is:

1. An apparatus which supports a load and limits a shock from being transmitted through said load comprising:

(a) a base;
    (b) first and third, spaced-apart, elongated struts each having a first and a second end, and each being positioned parallel to each other and aligned at a first acute angle relative to said base when said load is supported by said apparatus, each of said first and third struts having a first hole at said first end and a second hole at said second end;
    (c) second and fourth spaced-apart, elongated struts each having a first and a second end and each being positioned parallel to each other and aligned at a second acute angle relative to said base when the load is supported by the apparatus, each of said second and fourth struts having a first hole at said first end, and each having a second hole at said second end, said first, second, third and fourth struts being positioned such that said first ends of said first and said second struts are closer to each other than are said second ends of said first and said second struts, and said first ends of said third and said fourth struts are closer to each other than are said second ends of said third and fourth struts;
    (d) first and second upper rods positioned parallel to said base and to each other, which are aligned so that said first upper rod passes through said first hole in said first strut, and said first hole in said third strut, and said second upper rod passes through said first hole in said second strut and said first hole in said fourth strut, said first upper rod having a first bore positioned substantially parallel to said base and located outward of said first strut, and a second bore positioned substantially parallel to said base and located outward of said third strut, and said second upper rod having a first bore positioned substantially parallel to said base and located outward of said second strut and a second bore positioned substantially parallel to said base and located outward of said fourth strut;
    (e) first and second lower rods positioned parallel to said base and to each other aligned so that said first lower rod passes through said second hole in said first strut and said second hole in said third strut, and said second lower rod passes through said second hole in said second strut, and said second hole in said fourth strut;
    (f) a first leaf-spring inward of said first and third struts that extends in width substantially between said first and said third struts, and in its longitudinal direction starts at a line on said base and extends along said base, then between said first lower rod and said base in a direction away from the center of said load and around the side of said first lower rod toward the outside of said load, and then in a direction back toward the center of said load until said first leaf-spring contacts on the side of said first upper rod closest to said center of said load;
    (g) a second leaf-spring inward of said second and fourth struts that extends in width substantially between said second and said fourth struts and in its longitudinal direction starts at a point on said base and extends along said base in the direction opposite to the direction in which said first leaf-spring extends along said base, then between said second lower rod and said base in a direction away from the center of said load, and around the side of said second lower rod toward the outside of said load, and then back toward the center of said load until said second leaf-spring contacts the side of said second upper rod closest to said center of said load;
    (h) a first slide rod positioned parallel to said base and normal to said first and second upper rods, which passes into said first bore of said first upper rod and said first bore of said second upper rod, and said first slide rod is freely movable in one of said first bores and is secured in the other of said first bores; and
    (i) a second slide rod positioned parallel to said base and normal to said first and second upper rods, which passes into said second bore of said first upper rod and said second bore of said second upper rod, and said second slide rod is freely movable in one of said second bores and is secured in the other of said second bores.

2. An apparatus as claimed in claim 1 which comprises first, second, third and fourth cylindrical support rollers that each have central axis holes and are respectively positioned so that said first roller is located on said first upper rod intermediate said first strut and said first slide rod, said second roller is located on said first upper rod intermediate said third strut and said second slide rod, said third roller is located on said second upper rod intermediate said second strut, and said second slide rod and said fourth roller is located on said second upper rod intermediate said fourth strut and said second slide rod.

3. An apparatus as claimed in claim 1 comprising first and second brackets secured to said base wherein said first bracket has a width that is at least as wide as the width between said first and third struts and has a surface that limits the displacement of said first leaf-spring in the vicinity of the area of said first leaf-spring, where said first leaf-spring passes around said first lower rod, and said second bracket has a width that is at least as wide as the width between said second and fourth struts, and has a surface that limits the displacement of said second leaf-spring in the vicinity of the area of said second leaf-spring where said second leaf-spring passes around said second lower rod.

4. An apparatus as claimed in claim 1 wherein said first slide rod comprises a head that is larger than said first bores, and contacts one of said first and second upper rods on the outside of said contacted upper rod and a threaded opposite end, wherein said first bore of the other of said first and second upper rods comprises screw threads into which said opposite end of said first slide rod is threaded, and said second slide rod comprises a head that is larger than said second bores and contacts one of said first and second upper rods on the outside of said contacted upper rod, and a threaded opposite end wherein said second bore of the other of said first and second upper rods comprises screw threads into which said opposite end of said second slide rod is threaded.

5. An apparatus as claimed in claim 1 wherein said first and second leaf-springs each comprise a stack of a plurality of leaf-springs.

6. An apparatus as claimed in claim 5 which comprises first, second, third and fourth cylindrical support rollers that each have central axis holes and are respectively positioned so that said first roller is located on said first upper rod intermediate said first strut and said first slide rod, said second roller is located on said first upper rod intermediate said third strut and said second slide rod, said third roller is located on said second upper rod intermediate said second strut and said second slide rod, and said fourth roller is located on said second upper rod intermediate said fourth strut and said second slide rod.

7. An apparatus as claimed in claim 5 wherein said first slide rod comprises a head that is larger than said first bores and contacts one of said first and second upper rods on the outside of said contacted upper rod and a threaded opposite end, wherein said first bore of the other of said first and second upper rods comprises screw threads into which said opposite end of said first slide rod is threaded, and said second slide rod comprises a head that is larger than said second bores and contacts one of said first and second upper rods on the outside of said contacted upper rod and a threaded opposite end, wherein said second bore of the other of said first and second upper rods comprises screw threads into which said opposite end of said second slide rod is threaded.

8. An apparatus as claimed in claim 5 comprising first and second brackets secured to said base wherein said first bracket has a width that is at least as wide as the width between said first and third struts and has a surface that limits the displacement of said first leaf-spring in the vicinity of the area of said first leaf-spring where said first leaf-spring passes around said first lower rod, and said second bracket has a width that is at least as wide as the width between said second and fourth struts and has a surface that limits the displacement of said second leaf-spring in the vicinity of the area of said second leaf-spring where said second leaf-spring passes around said second lower rod.

9. An apparatus as claimed in claim 7 which comprises first, second, third and fourth cylindrical support rollers that each have central axis holes and are respectively positioned so that said first roller is located on said first upper rod intermediate said first strut and said first slide rod, said second roller is located on said first upper rod intermediate said third strut and said second slide rod, said third roller is located on said second upper rod intermediate said second strut and said second slide rod, and said fourth roller is located on said second upper rod intermediate said fourth strut and said second slide rod.

10. An apparatus as claimed in claim 8 comprising first and second brackets secured to said base, wherein said first bracket has a width that is at least as wide as the width between said first and third struts and has a surface that limits the displacement of said first leaf-spring in the vicinity of the area of said first leaf-spring where said first leaf-spring passes around said first lower rod, and said second bracket has a width that is at least as wide as the width between said second and fourth struts and has a surface that limits the displacement of said second leaf-spring in the vicinity of the area of said second leaf-spring where said second leaf-spring passes around said second lower rod.

11. An apparatus as claimed in claim 4 which comprises first, second, third and fourth cylindrical support rollers that each have central axis holes and are respectively positioned so that said first roller is located on said first upper rod intermediate said first strut and said first slide rod, said second roller is located on said first upper rod intermediate said third strut and said second slide rod, said third roller is located on said second upper rod intermediate said second strut and said second slide rod, and said fourth roller is located on said second upper rod intermediate said fourth strut and said second slide rod.

12. An apparatus as claimed in claim 11 comprising first and second brackets secured to said base wherein said first bracket has a width that is at least as wide as the width between said first and third struts and has a surface that limits the displacement of said first leaf-spring in the vicinity of the area of said first leaf-spring where said first leaf-spring passes around said first lower rod, and said second bracket has a width that is at least as wide as the width between said second and fourth struts and has a surface that limits the displacement of said second leaf-spring in the vicinity of the area of said second leaf-spring where said second leaf-spring passes around said second lower rod.

13. An apparatus which supports a load and limits a shock force from being transmitted through said load comprising:
 (a) a base;
 (b) four elongated struts each positioned to support said load such that said struts are each aligned at a first acute angle relative to said base when no shock force is applied to said load, and said struts are coupled to one of four pivot members so that said struts are each aligned at a second acute angle relative to said base when a shock force is applied to said load, wherein said second acute angle is smaller than said first acute angle;

(c) said four pivot members secured to said base, each pivot member being associated with one of said struts;

(d) a pair of spring retaining members each attached to two of said struts;

(e) a pair of leaf-springs each positioned to abut said base and to abut one of said spring retaining members constructed to be in a first relatively relaxed state when no shock force is applied to said load, and a second relatively unrelaxed state when a shock force is applied to said load during which unrelaxed state each of said leaf-springs applies a force to its respective strut that tends to drive said struts back to said first acute angle alignment with said base; and (f) a pair of restraint members each coupled to two of said struts to align them at said first angle relative to said base when no shock force is applied to said load and constructed to allow said struts to move to said second angle relative to said base when a shock force is applied to said load.

14. An apparatus as claimed in claim 13 wherein said spring retaining members comprise a pair of cylindrical rollers that are each coupled between two of said struts.

15. An apparatus as claimed in claim 13 wherein said pivot members each comprise a bracket secured to said base.

16. An apparatus as claimed in claim 13 wherein said spring retaining members each comprise a slide rod secured to one of said spring retaining members and freely moveable relative to the other of said spring retaining members when a shock force is applied to said load.

17. An apparatus as claimed in claim 13 wherein said leaf-springs each comprise a stack of a plurality of leaf-springs.

18. An apparatus as claimed in claim 14 wherein said spring retaining members each comprise a slide rod secured to one of said spring retaining members and freely moveable relative to the other of said spring retaining members when a shock force is applied to said load.

19. An apparatus as claimed in claim 18 wherein said leaf-springs each comprise a stack of a plurality of leaf-springs.

20. An apparatus as claimed in claim 19 wherein said pivot members each comprise a bracket secured to said base.

* * * * *